June 3, 1930.     W. H. POWLESSON     1,761,746
SHEET GLASS SURFACING TABLE
Filed Jan. 10, 1927
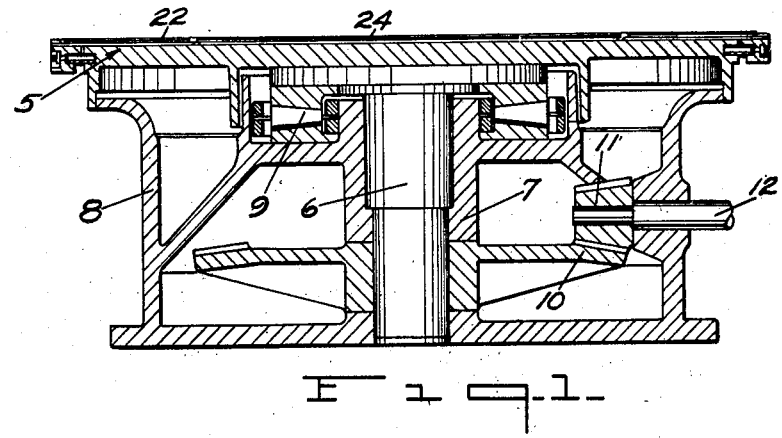
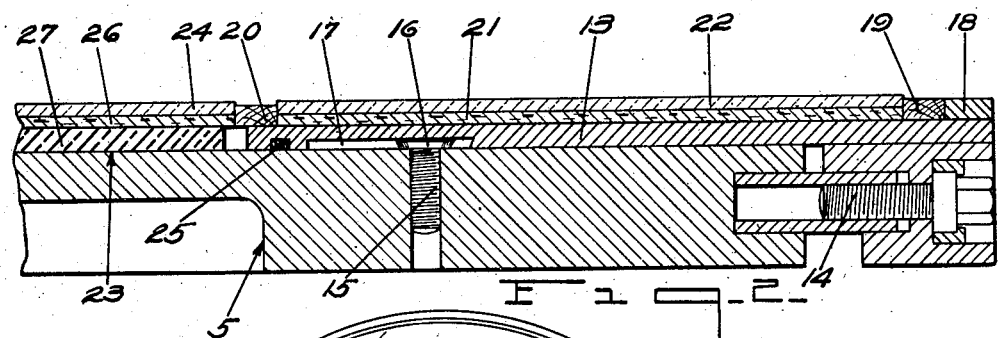
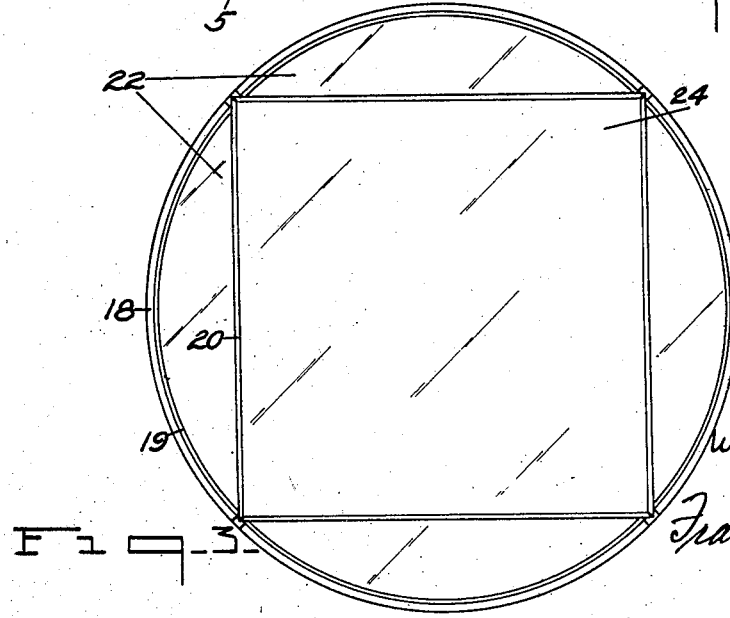
Inventor
William H. Powlesson
Frank Fraser
Attorney Patented June 3, 1930

1,761,746

UNITED STATES PATENT OFFICE

WILLIAM H. POWLESSON, OF TOLEDO, OHIO, ASSIGNOR TO LIBBEY-OWENS GLASS COMPANY, OF TOLEDO, OHIO, A CORPORATION OF OHIO

SHEET-GLASS-SURFACING TABLE

Application filed January 10, 1927. Serial No. 160,100.

This invention relates broadly to sheet glass surfacing apparatus and has more particular reference to a table adapted to support the sheet during the surfacing operations.

In the manufacture of plate glass, a blank is ground and polished upon both sides to remove any waves or surface distortions so that a clearer, true vision can be had when looking therethrough. To do this, it is necessary to support the plate glass blank during the surfacing operations in a manner that the opposite surfaces of the sheet will, after they have been ground and polished, be almost absolutely parallel to each other which means that the sheet must be of uniform thickness throughout.

It is an aim of the present invention to provide a table having a sheet glass receiving recess therein for supporting the sheet during the grinding or polishing operations in a manner that both sides of the sheet can be ground and polished to produce an absolutely uniform sheet of plate glass.

Another object of the invention is to provide a table of the above character wherein the plate glass blank can be freely supported during the surfacing operations, the said sheet being placed within a recess formed in the supporting table, and includes a protective pad interposed between the bottom of the recess and the sheet of glass being surfaced.

A further object of the invention is to provide a table of the above character having a recess for receiving a sheet of glass during the surfacing thereof and including a supporting pad resting upon the bottom of the recess, and a protective pad interposed between the glass and the first named pad.

A still further object of the invention is to provide a table of the above character having a recess for receiving a sheet of glass to be surfaced and including an asbestos supporting pad resting loosely upon the bottom of the recess, and a protective pad loosely interposed between the glass and the first named pad.

Other objects and advantages of the invention will become more apparent during the course of the following description when taken in connection with the accompanying drawings.

In the drawings forming a part of this application and wherein like numerals are employed to designate like parts throughout the same, Fig. 1 is a central vertical section through an improved form of supporting table constructed in accordance with the present invention.

Fig. 2 is a fragmentary section through a portion of the table, and

Fig. 3 is a top plan view of the table.

In the drawings, the sheet supporting table, designated in its entirety by the numeral 5, is mounted at the upper end of a vertical column 6 which freely rotates in bearings 7 within the frame work 8. The table is preferably supported upon suitable roller bearings 9 and rotated by means of a large bevelled gear 10 secured to column 6 and driven through a bevelled pinion 11 keyed to the drive shaft 12, said shaft being rotated from any suitable source of power such as an electric motor or the like.

The table 5 has associated therewith a series of preferably four segments or plates 13 each being adjustable through means of a screw arrangement 14. A stud 15 is provided with a head 16 adapted to run in the guideway 17 to prevent accidental displacement of the plates 13 when in use.

Secured to the upper surface of each of the segments or plates 13 adjacent to and conforming with the outer curved edge thereof is an arcuately curved strip of metal 18 which forms a backing for the similarly curved wooden strip 19. Extending between the opposite ends of the curved wooden strip 19 is a straight wooden strip 20 also secured to the plate or segment 13. This arrangement of the strips 19 and 20 provides a recess in the top of each plate or segment 13 and arranged within each of these recesses is a loosely laid pad 21 preferably of cork, although it may obviously be of felt or similar cushioning material. The pad 21 is adapted to freely support a glass plate 22 and these plates constitute improved tool-supporting surfaces as has been clearly set forth and claimed in the copending application of Thomas J. Leyland filed Jan. 10, 1927, Serial No. 160,060.

The four plates or segments 13 define a recess 23 within which the glass sheet 24 may be positioned during the surfacing operations and this recess may be slightly larger than the sheet of glass being surfaced if desired so that the said sheet may be free to move within said recess during the grinding and polishing operations. The under surface of each plate or segment 13 is preferably provided with a recess within which is disposed a felt wiper 25 which will prevent the abrasive fed onto the glass sheet from finding its way under the said plates.

In order that the surfaces of the sheet will be parallel to each other, the bottom of the recess 23 is so formed that it will produce a master surface which will be reproduced upon the plate of glass being ground. To prevent injury to the underside of the sheet while within the recess, the said sheet is loosely laid upon a composition pad 26 which is preferably cork, and an asbestos pad 27 is interposed between the cork pad 26 and the bottom of recess 23. The asbestos pad is not in any way cemented or fastened within the recess but is placed loosely therein and the cork pad is also loosely laid upon the asbestos pad so that both of said pads will be permitted to move around within the recess as does the sheet.

It has been found in actual use that a very good plate of glass can be produced when said glass is supported within the recess in the above manner. The asbesos pad is very durable and will last a considerable length of time so that the ultimate cost of surfacing the glass will be reduced. This pad also does not ball up or wrinkle when loosely mounted within the recess. Moreover, during the polishing operation, a great amount of desirable heat is generated and the asbestos pad prevents this heat from escaping through the table. The cork pad 27 is interposed between the glass sheet and asbestos pad in order to protect said sheet as cork is not as hard and consequently not as detrimental to the glass as would be the asbestos pad did it contact directly therewith.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass surfacing apparatus, a glass supporting table, and an abestos pad carried by said table and adapted to support the sheet to be surfaced.

2. In sheet glass surfacing apparatus, a glass supporting table, an asbestos pad resting upon said table, and a cushioning pad supported upon said asbestos pad and adapted to receive thereon the glass sheet to be worked upon.

3. In sheet glass surfacing apparatus, a glass supporting table, and a plurality of superimposed pads carried by said table and adapted to support thereon the glass sheet to be surfaced, the bottom pad being formed of asbestos and the top pad of a softer material.

4. In sheet glass apparatus, a glass supporting table having a recess in its upper surface, and a plurality of pads loosely arranged within said recess in superimposed relation, and being freely movable independently of one another, the glass sheet to be surfaced being also received within said recess and resting upon the uppermost pad, the bottom pad being formed of asbestos and the uppermost pad of cork.

Signed at Toledo, in the county of Lucas and State of Ohio, this 6th day of January, 1927.

WILLIAM H. POWLESSON.